United States Patent [19]

Bierhoff

[11] Patent Number: 4,583,209

[45] Date of Patent: Apr. 15, 1986

[54] APPARATUS FOR REPRODUCING INFORMATION FROM AN OPTICALLY READABLE RECORD CARRIER

[75] Inventor: Martinus P. M. Bierhoff, Eindhoven, Netherlands

[73] Assignee: U.S. Philips Corporation, New York, N.Y.

[21] Appl. No.: 570,564

[22] Filed: Jan. 13, 1984

[30] Foreign Application Priority Data

Oct. 17, 1983 [NL] Netherlands ............... 8303560

[51] Int. Cl.⁴ .................................. G11B 7/00
[52] U.S. Cl. ......................................... 369/46
[58] Field of Search ......................... 369/44, 45, 46

[56] References Cited

U.S. PATENT DOCUMENTS

| | | | |
|---|---|---|---|
| 4,051,527 | 9/1977 | Braat | 369/46 |
| 4,057,833 | 11/1977 | Braat | 369/46 |
| 4,408,314 | 10/1983 | Yokota | 369/46 |
| 4,467,462 | 8/1984 | Shibata | 369/46 |
| 4,497,048 | 1/1985 | Kimura | 369/46 |

*Primary Examiner*—Donald McElheny, Jr.
*Attorney, Agent, or Firm*—Robert T. Mayer; Algy Tamoshunas

[57] ABSTRACT

An apparatus is described for reading an optically readable record carrier in which a light beam which has been modulated by the record carrier is incident on a detector divided into four quadrants. A tracking-error signal is obtained by measuring the time intervals between corresponding zero crossings of a first signal supplied by two diagonally situated sub-detectors of said detector and a second signal supplied by the two other diagonally situated sub-detectors and/or all four sub-detectors.

6 Claims, 6 Drawing Figures

APPARATUS FOR REPRODUCING INFORMATION FROM AN OPTICALLY READABLE RECORD CARRIER

BACKGROUND OF THE INVENTION

The invention relates to an apparatus for reproducing information from an optically readable record carrier on which information is stored in the form of a track of optically detectable areas which alternate with intermediate areas. Such an apparatus comprises an optical system for projecting a light beam on an optical detector via the record carrier. The detector comprises four sub-detectors situated in separate quadrants of an imaginary X-Y-coordinate system whose origin is situated on the optical axis of the optical system, with the X-axis extending effectively in the track direction and the Y-axis extending effectively transversely of the track direction. The apparatus further includes a first adder circuit for adding the signals supplied by diagonally disposed first and third sub-detectors to form a first signal, a second adder circuit for adding the signals supplied by at least the other two sub-detectors to form a second signal, and a tracking-error signal generator for deriving a tracking-error signal from the first and the second signals.

Such an apparatus is described in Netherlands Patent Application No. 7600842 corresponding to U.S. Pat. No. 4,057,833 and may be employed in, inter alia compact-disc digital audio players.

In the known apparatus a tracking-error signal is obtained by shifting the phase of the second signal through 90°, multiplying said phase-shifted signal by the first signal, and subsequently passing it through a low-pass filter. Such a method of generating the tracking-error signal is found to be unsatisfactory, in particular in compact-disc players because the 90° phase shift cannot be obtained due to the varying instantaneous frequency of the signal being read and because the generated tracking-error signal is influenced considerably by the recorded information signal.

SUMMARY OF THE INVENTION

It is the object of the invention to provide an apparatus of the type specified in the opening paragraph which does not require a 90° phase shift of the signal being read and in which the generated tracking-error signal is less dependent on the recorded information.

According to the invention the apparatus is characterized in that the tracking-error signal generator comprises means for measuring the time interval between corresponding zero crossings of the first and the second signal and generating a signal which depends on that time interval and forms the tracking-error signal.

The apparatus in accordance with the invention meets the desired object because:

it does not require a 90° phase-shift of a signal whose instantaneous frequency is not fixed, the time measurement is locked to the zero crossings of the signal being read and consequently to the instantaneous frequency of the signal being read, so that the time measurement exhibits a repetition frequency which is equal to the instantaneous frequency of the signal being read, thus minimizing crosstalk of the signal spectrum into the tracking-error signal, the time measurement is hardly influenced by the amplitude of the signal being read, so that the tracking-error signal is highly independent of the amount of detected light and consequently of the optical properties of the record carrier and the intensity of the light beam, the instantaneous frequency of the signal being read does not influence the amplitude of the error signal, in contradistinction to the known apparatus in which a phase difference is measured by synchronous detection, so that a frequency-dependent relationship is established between the tracking-error signal and the tracking error.

a possible variation of the d.c. level of the signal being read does not influence the time measurement within specific limits.

An embodiment of the apparatus in accordance with the invention which is intended for reading a record carrier in which information of a substantially fixed bit frequency is stored, may be further characterized by first and second zero-crossing detectors for supplying first and second pulses respectively at the zero crossings of the first and the second signal respectively, first and second tuned circuits which are tuned to the bit frequency or upper harmonics thereof and which are excited by the first and the second zero-crossing detectors respectively, and a first phase detector for detecting the phase difference between the signals supplied by the first and the second tuned circuit.

By means of this step the time measurement is reduced to a phase measurement with constant frequency, which can be effected very simply. This embodiment may be further characterized by a third zero-crossing detector for supplying third pulses at zero crossings of the third signal, a third tuned circuit which is tuned to the bit frequency or an upper harmonic thereof, and which is excited by said third zero-crossing detector, a second phase detector for detecting the phase difference between the signals supplied by the second and the third tuned circuits, and a summing device for adding the signals supplied by the first and the second phase detector.

An alternative to this embodiment may be characterized in that the apparatus comprises means for generating a pulse-shaped signal of a duration corresponding to the interval between corresponding zero crossings of the first and the second signal, time-measurement means for determining the duration of the pulses of said pulse-shaped signal, direction-detection means for detecting the sequence in which corresponding zero crossings of the first and the second signal occur and in response thereto inverting or not inverting the polarity of the output signal of the time-measurement means.

With respect to the means for generating the pulse-shaped signal, this embodiment may be further characterized in that the means for generating a pulse-shaped signal comprise first and second limiter means for converting the first and the second signal into a substantially rectangular signal, and a gate circuit with an exclusive-OR function to which said limited signals are applied, and with respect to the direction-detection means, in that the direction-detection means comprise a detector which determines the polarity of the first signal at the instant of a zero-crossing of the second signal.

BRIEF DESCRIPTION OF THE DRAWINGS

The invention will now be described in more detail, by way of example, with reference to the drawings, in which.

DESCRIPTION OF THE PREFERRED EMBODIMENTS

Figure 1:
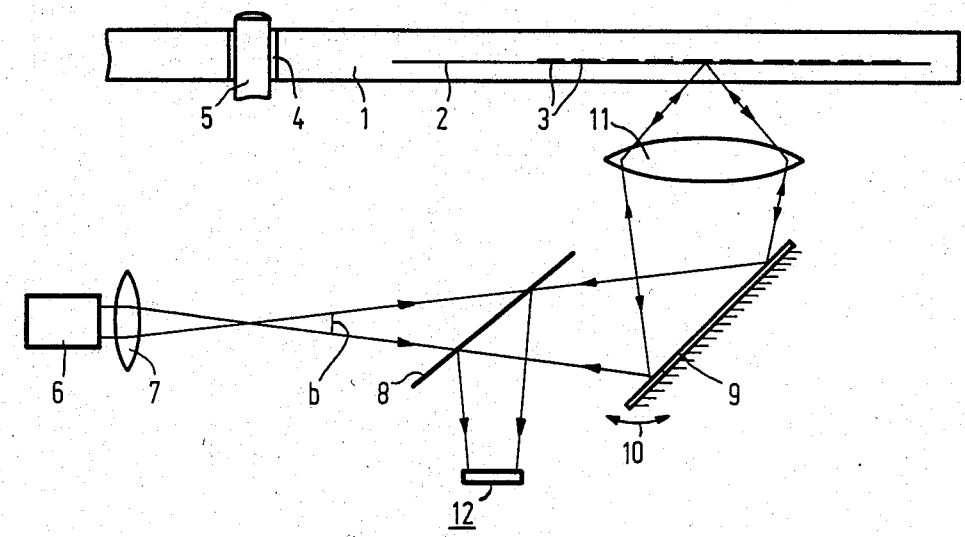
FIG. 1 shows an apparatus for reading an optically readable record carrier.

FIG. 1 shows a round disc-shaped record carrier 1 in radial cross-section. The information structure is assumed to be reflecting and comprises tracks of optically detectable areas alternating with intermediate areas. The information tracks bear the reference numeral 3. A radiation source 6, for example a semiconductor laser, emits a read beam 10. A mirror 9 reflects this beam to an objective system 11, which is schematically represented by a single lens. In the path of the read beam b, an auxiliary lens 7 is arranged, which ensures that the read beam fills the pupil of the objective system entirely. A radiation spot of minimal dimensions is then formed on the surface 2 of the information structure.

The read beam is reflected by the information structure and, as the record carrier rotates about a spindle 5 which projects through a centre hole 4, this beam is time-modulated in conformity with the information stored in the track to be read. The modulated read beam again passes through the objective system and is reflected by the mirror 9 in the same direction as the beam emitted by the source. Elements for separating the paths of the modulated and the unmodulated read beam are arranged in the radiation path of the read beam. These elements may comprise for example an assembly of a polarization-sensitive beam-splitter prism and a $\lambda/4$ plate. For simplicity it is assumed that in FIG. 1 said means comprise a semi-transparent mirror 8. This mirror reflects a part of the modulated read beam to a radiation-sensitive detection system 12.

The optical details of the information structure are very small. The read spot should therefore remain centred very accurately on the track to be read.

Figure 2:
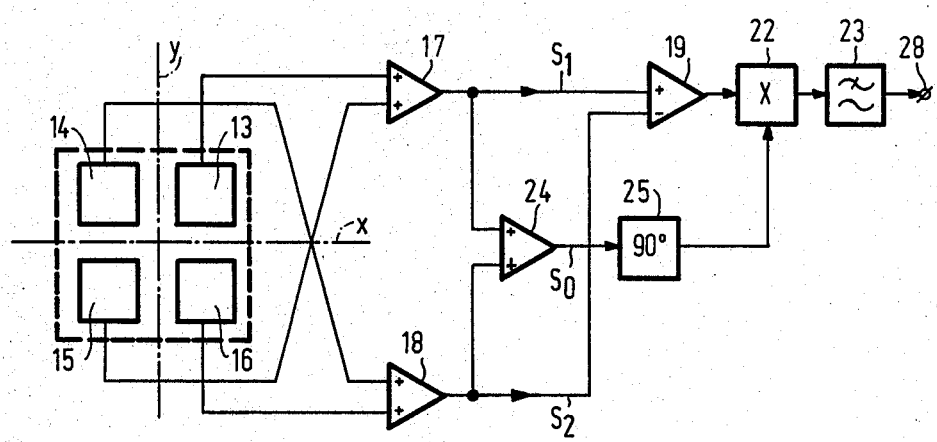
FIG. 2 shows a known tracking-error detector for use in the apparatus shown in FIG. 1.

In order to enable centring errors to be detected, the detection system 12 comprises, for example, four radiation-sensitive detectors, as is shown in FIG. 2. The four detectors 13, 14, 15 and 16 are disposed in four different quadrants of an X-Y-coordinate system. When a track portion to be read is projected onto the detection system the longitudinal direction and the lateral direction of the track portion extend parallel to the X-axis and the Y-axis respectively.

As is also shown in FIG. 2, the output signals of the detectors 13 and 14 are added to each other by means of the adder circuit 17 and the output signals of the detectors 14 and 15 are added to each other by means of the adder circuit 18. The output signals $S_1$ and $S_2$ of the adder circuits 17 and 18 are subtracted from each other in the subtractor circuit 19. The output of this circuit is connected to one of the inputs of a multiplier circuit 22. The output signal of the circuit 22 is applied to a low-pass filter 23. The desired control signal is obtained on the output 28 of this filter. Moreover, the output signals of the adder circuits 17 and 18 are added to each other in an adder circuit 24. The sum $S_0$ of the signals read by means of the four detectors 13, 14, 15 and 16, i.e. the desired read signal, then appears on the output of this adder circuit 24. Since the signal supplied by the subtractor circuit 19, which signal is the difference between the signals supplied by the two pairs of diagonally situated detectors 13, 14 and 14, 16 has a polarity which depends on the direction of the tracking error, i.e. the deviation of the spot formed by the laser beam b from the information track 3 to be followed, and varies when an optically detectable area or an intermediate area in the track 3 is scanned, the directional information is not available in the output signal of the subtractor circuit 19. In order to obtain this information, the sum signal from the adder circuit 24 is 90° shifted in phase in the phase shifter 25 and applied to the other input of the multiplier 22, which thus operates as a synchronous detector. The directional information of the tracking error is then contained in said output signal as the polarity of the low-frequency component (which is passed by the filter 23). For a further description of this known apparatus reference is made to Netherlands Patent Application No. 7600842.

Figure 3:
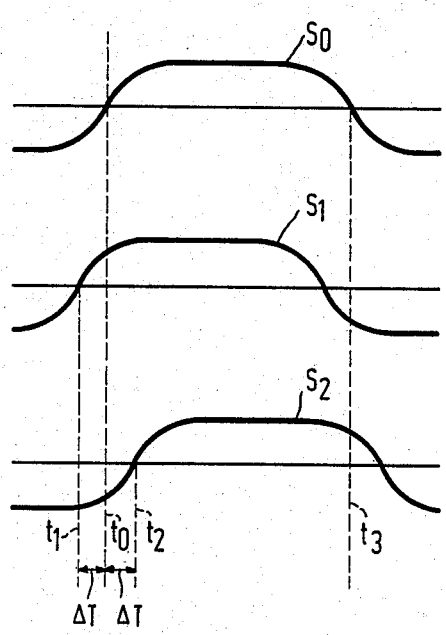
FIG. 3 shows some signal waveforms to illustrate the principle underlying the apparatus in accordance with the invention.

FIG. 3 shows some waveform diagrams to illustrate the principle of the apparatus in accordance with the invention. The Figure shows an example of the variation of the signals $S_1$, $S_2$ and $S_0$ when an optically detectable area passes the spot where the beam is incident. The signal $S_0$ then intersects the zero axis at an instant $t_0$. If the spot formed by the beam has such a deviation from the track that the image of the optically detectable area situated above the X-axis in the Figure, assuming that owing to the displacement of the record carrier this image moves to the left in the Figure, the passage of optically detectable areas will be detected by the detectors 13 and 15 before the detectors 14 and 16, which can be seen in the diagrams of FIG. 3 in that the signal $S_1$ intersects the zero axis at the instant $t_1$, which appears a time $\Delta t$ before the instant $t_0$, and in that the signal $S_2$ intersects the zero axis at the instant $t_2$, which appears a time $\Delta t$ after the instant $t_1$. If the deviation of the spot is exactly the opposite, the signal $S_2$ will intersect the zero axis at the instant $t_1$ and the signal $S_1$ at the instant $t_2$. The magnitude of the time interval $\Delta t$ is then a measure of the deviation of this spot. A tracking signal can then be found by measuring said time $\Delta t$. It is possible to measure the time interval between the instant $t_1$ and $t_2$, i.e. between the zero crossings of the signals $S_1$ and $S_2$ or, alternatively, to measure the time interval between one of the instants $t_1$ and $t_2$ and the instant $t_0$, i.e. between the zero crossings of the signal $S_1$ or $S_2$ and the signal $S_0$.

In comparison with the known apparatus a time measurement yields the following advantages:

it is not necessary to subject a signal whose instantaneous frequency is not fixed to a 90° phase shift, the measurement is locked to the zero crossings of the detected signal, i.e. to an instantaneous repetition frequency which follows the instantaneous frequency of the signal read, which means that crosstalk of the signal into the detected tracking-error signal on the output 28 is minimal, the amplitude of the signal being read hardly plays a role. The generation of the tracking-error signal is highly independent of the detected amount of light, i.e.

of the reflection coefficient of the disc and the intensity of the laser beam, the instantaneous frequency of the signal being read does not influence the amplitude of the tracking-error signal, which is in contradistinction to the known apparatus where a phase difference is detected by synchronous detection. The relationship between the tracking error and said phase difference is then inversely proportional to the instantaneous signal frequency, a variation of the d.c. level within specific limits will not affect the time measurement. Indeed, such a variation will give rise to a simultaneous shift of the instants $t_0$, $t_1$ and $t_2$ (FIG. 3), which will not affect the length of $\Delta t$.

Figure 5:
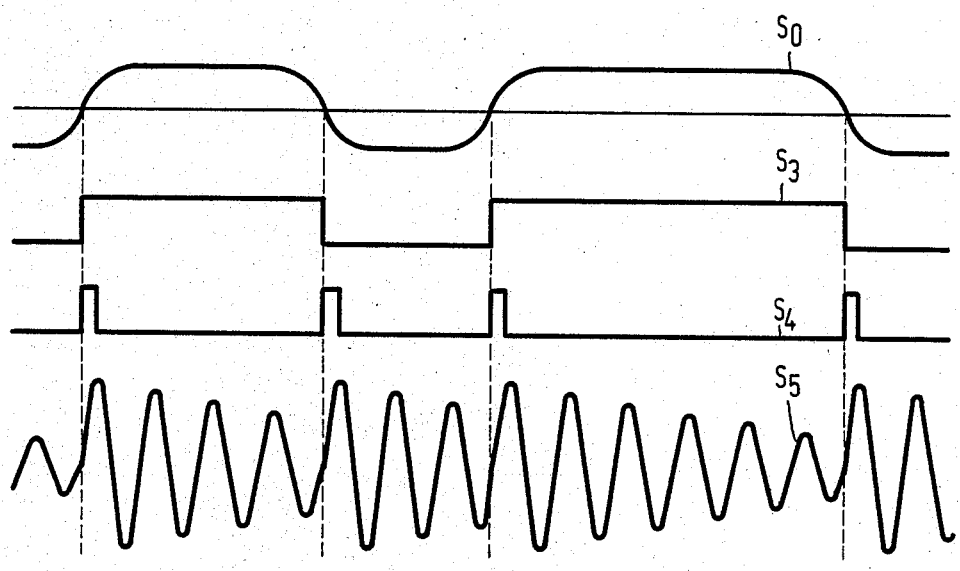
FIG. 5 shows some signal waveforms to illustrate the operation of the apparatus shown in FIG. 4.
Figure 4:
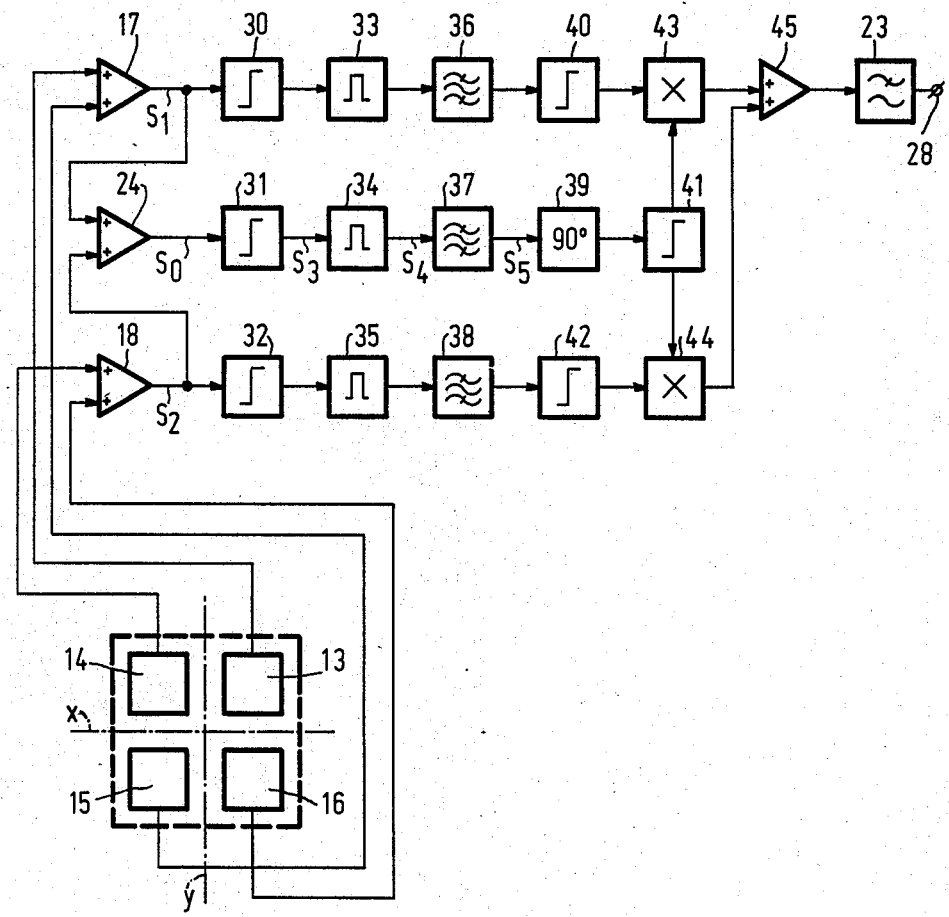
FIG. 4 shows a first example of a tracking-error signal generator for use in an apparatus in accordance with the invention.

FIG. 4 shows an embodiment of an apparatus in accordance with the invention which is intended in particular for use in conjunction with record carriers on which a digital signal (for example a digital audio signal) of fixed bit frequency is recorded, and in which the detectors 13 to 16 and the adder circuits 17, 24 and 18 are identical to those in FIG. 2. The signals $S_1$, $S_2$ and $S_0$ supplied by said adder circuits are applied to limiter circuits 30, 31 and 32 and subsequently to zero-crossing detectors 33, 34 and 35 which supply a pulse in the case of a zero crossing of their input signals, and which may comprise for example monostable multivibrators, differentiators and exclusive-OR gates, to which the signal is applied directly and with a specific time delay. The zero-crossing detectors 32, 34 and 35 excite band-pass filters 36, 37 and 38 which are tuned to a frequency $f_0$ which corresponds to the bit frequency of the reproduced signal. The operation of this part of the apparatus shown in FIG. 4 will be described with reference to FIG. 5. From top to bottom this Figure shows the signal $S_0$ at the output of the adder circuit 24, the signal $S_3$ at the output of the limiter circuit 31, the signal $S_4$ at an output of the zero-crossing detector 34, and the signal $S_5$ at the output of the band-pass filter 37. The signal $S_0$ is limited, so that a square-wave signal $S_3$ is obtained whose zero crossings coincide with the zero crossings of the signal $S_0$. The signal $S_4$ then comprises pulses in synchronism with the zero crossings. The narrow-band band-pass filter 37 is then excited by these pulses. As this filter is tuned to the bit frequency of the recorded signal, the pulses at the zero crossings always appear in phase with the waveform on the output of the band-pass filter 37. The signal $S_5$ is a waveform of the frequency $f_0$, which is excited each time and whose amplitude decays after every excitation. The instants at which the zero crossings of the signal $S_0$ appear are then defined by the instantaneous phase of the signal $S_5$. The band-pass filter thus functions as a hold circuit for the zero-crossing instant.

Similarly the band-pass filters 36 and 38 supply waveforms of the frequency $f_0$. Their mutual phase relationship depends on the intervals between the zero-crossing instants of the signals $S_0$, $S_1$ and $S_2$ and consequently on the tracking error.

The phase differences and the tracking-error signal are further determined in the same manner as in the apparatus shown in FIG. 2, but now by means of signals of constant frequency $f_0$. In order to preclude problems as a result of the varying amplitude of the output signals of the band-pass filters 36, 37 and 38, the signals are applied to limiter circuits 40, 41 and 42. The output signals of the limiter circuits 40 and 41 are applied to a multiplier 43 and the output signals of the limiter circuits 41 and 42 are applied to a multiplier 44. The low-frequency component of the output signal of the multiplier 43 then depends on the time interval $t_1-t_0$ (FIG. 3) and the low-frequency component of the output signal of the multiplier 44 on the time interval $t_0-t_2$. The two output signals are added to each other in the adder 45 and subsequently they are applied to the output 28 via the low-pass filter 23.

A disadvantage of the tracking-error detection in accordance with FIG. 4 is that the maximum time T which can be measured unambiguously is in principle equal to one period of the waveform of the frequency $f_0$ and, as a result of the use of multipliers for the phase detectors, it is even limited to a quarter of this period.

Figure 6:
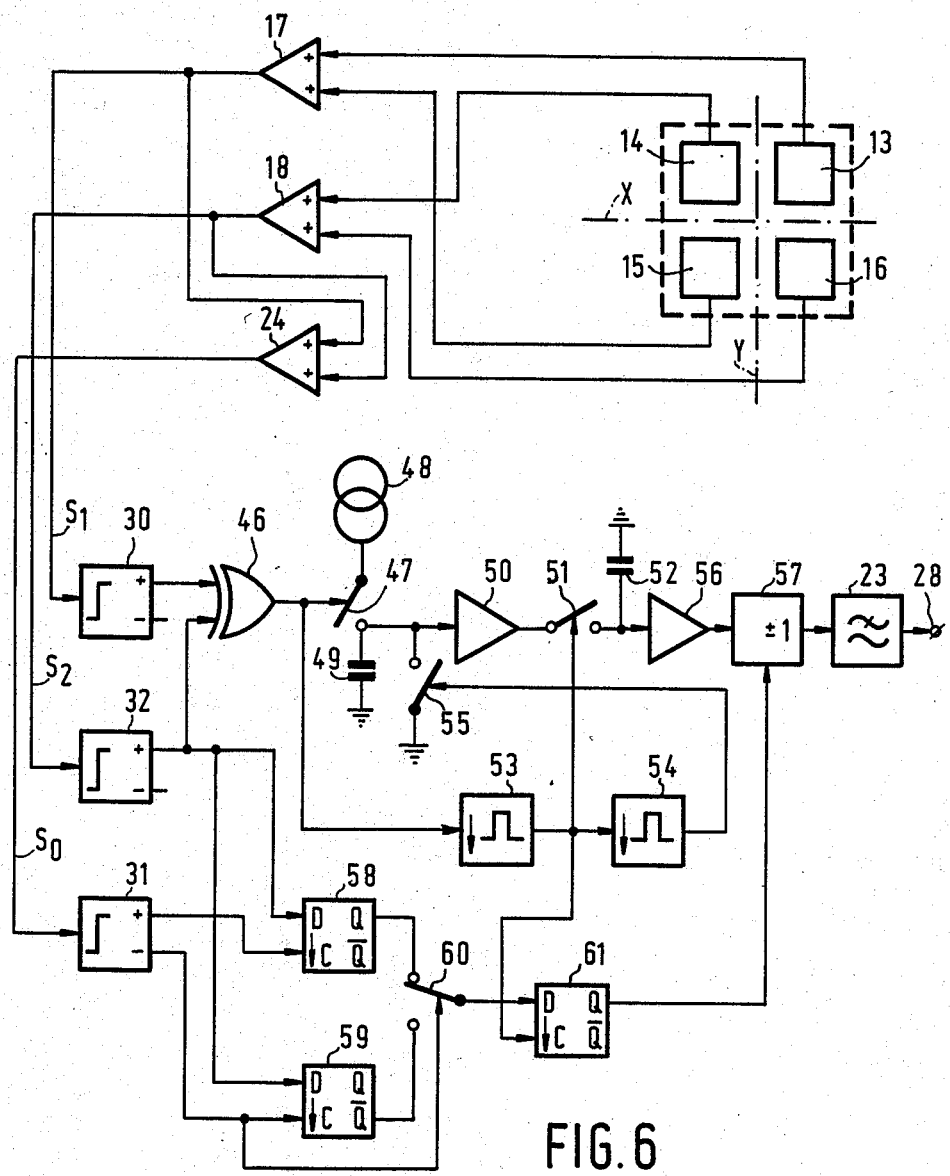
FIG. 6 shows a second example of a tracking-error signal generator for use in an apparatus in accordance with the invention.

FIG. 6 shows a second embodiment of an apparatus in accordance with the invention whose use is not limited to reading record carriers on which information of a substantially fixed bit frequency is recorded and whose measurement range is in principle equal to the length of the optically detectable area being read. In the same way as the apparatus shown in FIG. 4 it comprises the detectors 13, 14, 15 and 16, the adder circuits 17, 18 and 24, and the limiter circuits 30, 32 and 31. The output signals of the limiter circuits 30 and 32 are applied to an exclusive-OR gate 46. This gate then supplies an output signal during the intervals in which the output signals of the limiters 30 and 32 are of opposite polarity, i.e. during the intervals $t_1$ to $t_2$ (FIG. 3). The duration of the output signal of this exclusive-OR gate 46 is consequently a measure of the tracking error. In order to measure this duration the output signal of the gate 46 closes a switch 47, so that the current from a current source 48 charges a capacitor 49. The charge of this capacitor after the switch 47 has been opened again is than a measure of the duration of the output signal of the gate 46 and hence a measure of the tracking error. Via a voltage follower 50 and a switch 51 the capacitor 49 is connected to a capacitor 52. The switch 51 is actuated by the output signal of a pulse shaper 53 which responds to the negative edge of the output signal of the gate 46, so that the switch 51 is closed after switch 47 has been opened again and the capacitor 52 is charged to the value of the charge on the capacitor 49. The switch 51 and the capacitor 52 thus function as a hold circuit. A pulse shaper 54 responds to the negative edge of the output signal of the pulse shaper 53 and controls a switch 55 which is arranged in parallel with capacitor 49, so that after the charge of capacitor 49 has been detected via the switch 51, the capacitor 49 is discharged again via the switch 55.

The charge on capacitor 52 is a measure of the tracking error. However, the direction of this tracking error is still unknown. For this purpose the charge on capacitor 52 is applied to a switchable inverter circuit 57 via a voltage follower, so that the polarity of the signal after said switchable inverter circuit 57 is an indication of the direction of the tracking error. The output signal of said switchable inverter circuit is applied to an output 28 via the low-pass filter 23.

In order to determine the direction of the tracking error the output signal of the limiter 32 is applied to the D-input of a D-flip-flop 58, the output signal of the limiter 31 being applied to the clock input C. The flip-flop 58 is of a type which is triggered on the negative edge of the signal on its clock input C, so that the output signal of the flip-flop 58 follows the output signal of the limiter 32 at the zero-crossing instants during the negative edges of the signal $S_0$ (i.e. instant $t_3$ in FIG. 3). The output signal on the Q-output of the flip-flop 58 is then high if the signal $S_2$ is high at the instant $t_3$, or if the signal $S_2$ lags the signal $S_0$. Similarly, the output signal of the limiter 32 is applied to the O-input of a D flip-flop 59 and the inverted output signal of the limiter 31 is applied to the clock input C, so that flip-flop 59 is triggered on the zero-crossings of the signal $S_0$ during positive edges, or at the instant $t_0$ (FIG. 3). The inverted output $\overline{Q}$ of flip-flop 59 is then high if the signal $S_2$ is low at the instant $t_0$ or if the signal $S_2$ is lagging.

Via a change-over switch 60 which is actuated by the clock signal from flip-flop 59, the Q-output of flip-flop 58 and the $\overline{Q}$-output of flip-flop 59 are alternately connected to the D-input of a D flip-flop 61 which is clocked by the negative edges of the output signal of the pulse shaper 53, i.e. at the same time that the switch 61 which samples the charge on the capacitor 49 is closed. Thus, the flip-flop 61 generates a signal of a polarity corresponding to the direction of the tracking error, which flip-flop is clocked again after every time measurement, the flip-flop 61 in its turn controls the switchable inverter circuit 57.

In the apparatus shown in FIG. 6 the time interval $t_2-t_1$ (FIG. 3) is measured in the similar manner. A digital measurement is also possible, for example in the apparatus shown in FIG. 6 by starting a counter by means of the exclusive-or gate 46, which counter counts the counting pulses supplied by a high-frequency counting-pulse oscillator.

What is claimed is:

1. An apparatus for reproducing information from an optically readable record carrier on which information is stored in the form of a track of optically detectable areas which alternate with intermediate areas, which apparatus comprises an optical system for projecting a light beam onto an optical detector via the record carrier, which detector comprises four sub-detectors situated in four separate quadrants of an imaginary X-Y-coordinate system whose origin is situated on the optical axis of the optical system, the X-axis of the coordinate system extending effectively in the track direction and the Y-axis extending effectively transversely of the track direction, a first adder circuit for adding the signals supplied by diagonally disposed first and third sub-detectors to form a first signal, a second adder circuit for adding the signals supplied by at least the other two sub-detectors to form a second signal, and a tracking-error signal generator for deriving a tracking-error signal from the first and the second signal, the tracking-error signal generator comprising means for measuring the time interval between a given zero crossing of the first signal and a corresponding zero crossing of the second signal, said time interval measuring means generating a third signal representative of the time interval between said given and corresponding zero crossings and direction-detection means for detecting the sequence in which said zero crossings of the first and the second signal occur and in response thereto inverting or not inverting the polarity of the third signal to thereby form the tracking-error signal.

2. An apparatus as claimed in claim 1, wherein said tracking error signal generator includes means for generating a pulse shaped signal of a duration corresponding to the interval between said given and corresponding zero crossings and wherein said time measuring means determines the duration of said pulse shaped signal.

3. An apparatus as claimed in claim 2, wherein the means for generating said pulse-shaped signal comprise first and second limiter means for converting the first and the second signal into a substantially rectangular signal, and a gate circuit with an exclusive-or function to which said limited signals are applied.

4. An apparatus as claimed in claim 2 or 3, wherein the direction-detection means comprise a detector which determines the polarity of the first signal at the instant of a zero crossing of the second signal.

5. An apparatus for reproducing information from an optically readable record carrier on which information of a substantially fixed bit frequency is stored in the form of a track of optically detectable areas which alternate with intermediate areas, said apparatus comprising an optical system for projecting a light beam onto an optical detector via the record carrier, said detector having four sub-detectors disposed in four separate quadrants of an imaginary X-Y coordinate system whose origin is on the optical axis of the optical system, the X axis of said coordinate system effectively extending in the track direction and the Y axis effectively extending transversely of the track direction, first means for adding signals supplied by diagonally disposed first and third sub-detectors to form a first signal, second means for adding signals supplied by at least the other two sub-detectors to form a second signal, and means responsive to zero crossings of said first and second signals for generating a tracking error signal in dependence on the time interval between corresponding zero crossings of said first and second signals, said generating means comprising a first and second zero crossing detector for supplying first and second pulses, respectively, at the zero crossings of the first and second signals, respectively, first and second tuned circuits which are tuned to the bit frequency or upper harmonics thereof and which are excited by said first and said second zero crossing detectors, respectively, and means for detecting the phase difference between the signals supplied by said first and second tuned circuits.

6. An apparatus according to claim 5 wherein said phase detecting means includes means for adding the signals supplied by all four sub-detectors to form a third signal, a third zero crossing detector for supplying third pulses at zero crossings of said third signal, a third tuned circuit which is tuned to said bit frequency or an upper harmonic thereof and which is excited by said third zero crossing detector, a first phase detector for detecting the phase difference between the signal supplied by said first and third tuner circuits, a second phase detector for detecting the phase difference between signals supplied said second and third tuning circuits, and a summing device for adding the signal supplied by said first and second phase detectors.

* * * * *